Feb. 21, 1967

E. K. NORRIS

3,304,973

MUSHROOM END CUTTER

Filed May 1, 1964

INVENTOR.
EARL K. NORRIS,
BY
McMorrow, Berman & Davidson
ATTORNEYS.

Feb. 21, 1967    E. K. NORRIS    3,304,973
MUSHROOM END CUTTER
Filed May 1, 1964    6 Sheets-Sheet 6

INVENTOR.
EARL K. NORRIS,
BY
McMorrow, Berman & Davidson
ATTORNEYS.

ated Feb. 21, 1967

3,304,973
MUSHROOM END CUTTER
Earl K. Norris, Gap, Pa. 17527
Filed May 1, 1964, Ser. No. 364,183
10 Claims. (Cl. 146—81)

This invention relates generally to novel improvements in food processing machinery, and to specific improvements in machinery of the general type shown and described in my prior copending application entitled Food Machinery, filed July 31, 1962, and bearing Serial No. 213,787, now Patent Number 3,179,138.

A basic objective of the present invention is to provide an improved feeder mechanism means which simplifies and expedites the initial introduction of the food product into the machinery and which eliminates, to a significant degree, the necessity for manual handling of the food product.

A further object of importance in the present invention resides in the provision of plural food machinery, the machinery including individual components arranged in side-by-side battery, the components thereof employing common prime mover assemblies.

The processing machinery incorporates and retains certain of the objects and advantages of my prior copending application, referred to above, including that of providing a machine adapted to perform multiple cutting operations on a vegetable or like product, particularly a mushroom, including the severance and discharge of the root, and severance of the crown from the stem with discharge thereof in separate discharge means. Further common objects of this and the invention of my prior application include the provision of unitary apparatus for performing the above described operations; the provision of safer cutting machinery by the reduction in manual handling of the foods; provision of a machine automatically handling mushrooms of various sizes; and the elimination of the necessity for pregrading of the mushrooms prior to cutting.

Additional objects and advantages of the invention will appear to those skilled in the art upon consideration of the following specification when read in conjunction with the annexed drawings, in which.

Figure 1:
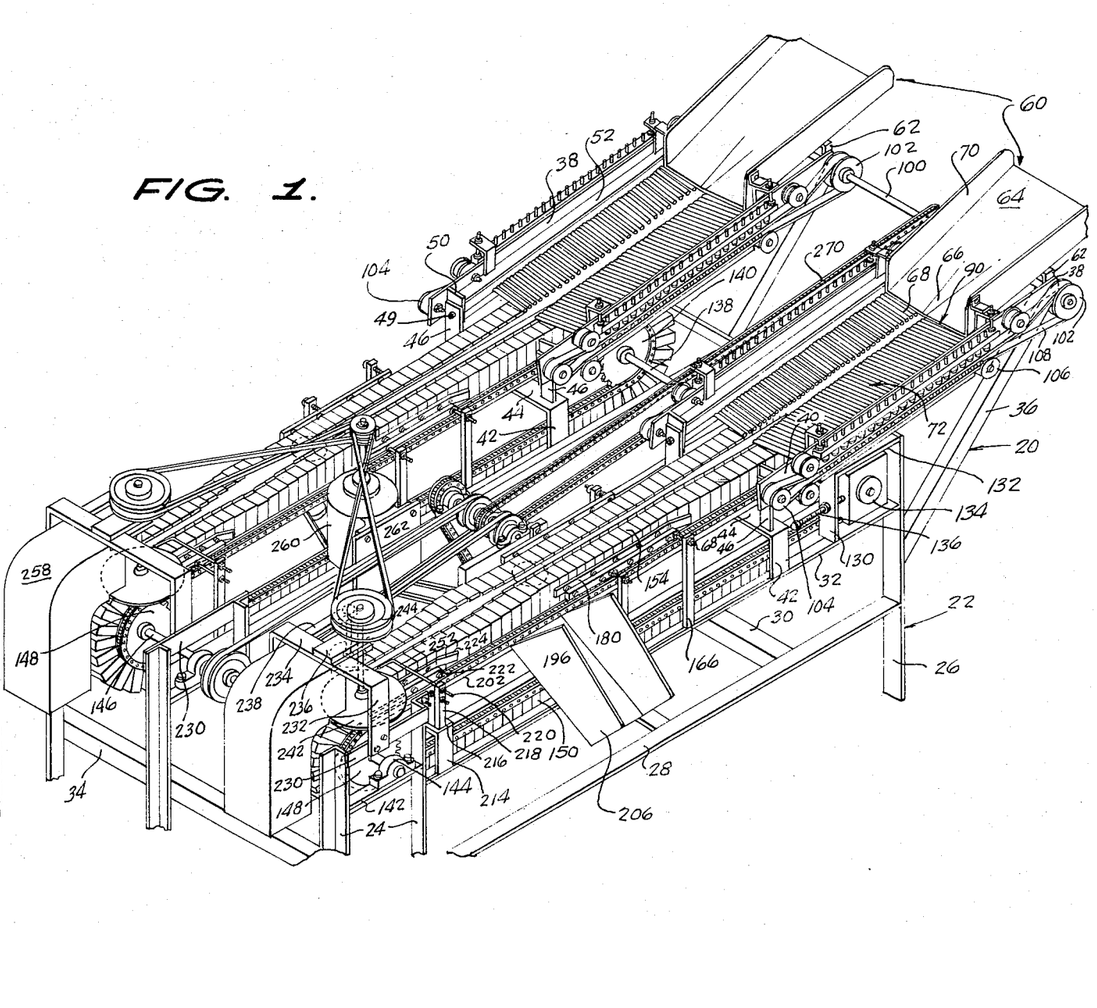
FIGURE 1 is a perspective view, partially broken away, showing food processing machinery constructed and assembled in accordance with the teachings of this invention.
Figure 3:
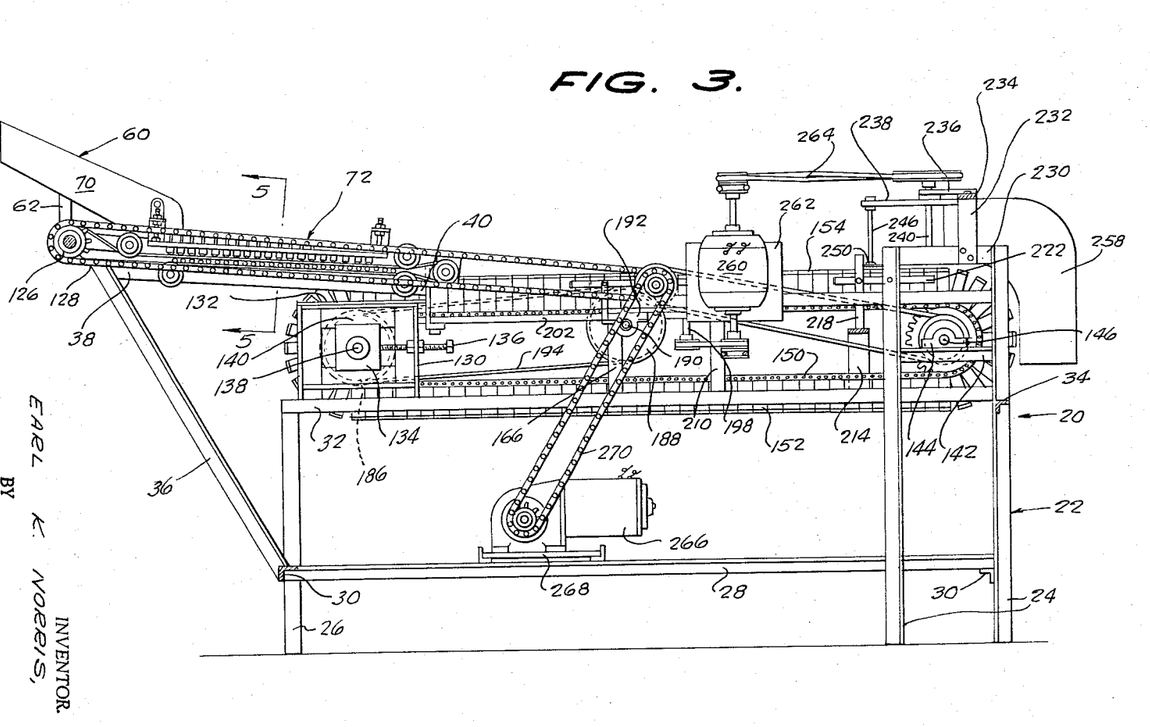
FIGURE 3 is a vertical cross sectional view, taken substantially on the line 3—3 of FIGURE 2, looking in the direction of the arrows.

Referring in more detail to the drawings, the apparatus hereof is generally designated therein by reference numeral 20. In FIGURES 1 and 3, it is seen that the apparatus is mounted on supporting framework 22 including a plurality of elongated vertical legs 24 arranged in pairs adjacent the discharge end of the apparatus, and a plurality of vertical support legs 26 at the opposite end thereof. The framework further includes a plurality of longitudinal lower braces 28 connecting the legs, having connecting lower transverse braces 30, and further includes upper longitudinal braces 32 with cross braces 34 at appropriate locations. The supporting structure or framework 22 is is course subject to design variation without departure from the invention.

Figure 4:
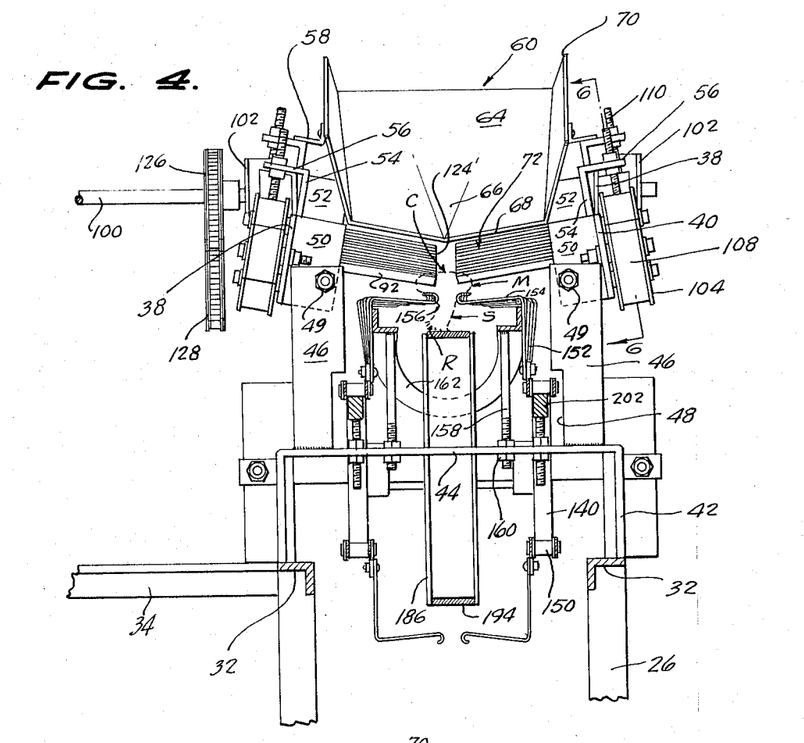
FIGURE 4 is an enlarged, detail sectional view taken along line 4—4 of FIGURE 2, looking in the direction of the arrows.
Figure 5:
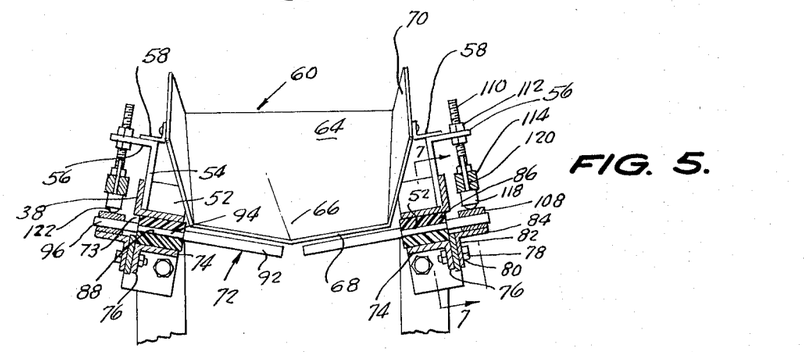
FIGURE 5 is an enlarged, detail cross section of the feeder mechanism hereof, the section being shown at 5—5 in FIGURE 3, in the direction of the arrows.

As shown in FIGURE 3, a plurality of outwardly and upwardly inclined braces 36 extend from the lower cross brace 30 adjacent one end of the framework. The distal ends of the braces 36 are each secured to one end of elongated brackets 38 which are inclined toward the frame 22, and have a forward end 40. Substantially U-shaped brackets 42 are mounted to bridge adjacent pairs of the upper longitudinal braces 32, and each bracket 42 includes a horizontal portion 44 with a pair of spaced apart, upstanding plates 46 secured thereto, the plates 46 being slotted at 48 to permit close passage of a chain means hereof, as appears below in more detail. Secured to the plates 46 by bolt means 49 are substantially rectangular elements 50 arranged angularly with respect to the plates and suitably fixed to the inner ends of the brackets 38. Elongated rigidifying elements 52 are secured to the inner faces of the brackets 38 and are inclined inwardly with the brackets and the elements 50. A plurality of structural members 54 of inverted L-shape, including outwardly projecting, apertured arms 56 are provided along the brackets 38 and clips 58 are fixed thereto as shown in FIGURES 4 and 5.

Mounted between opposite clips 58 arranged at their forward ends are a plurality of input hoppers 60 supported intermediate their ends by support bar 62 fixed to the outer ends of the brackets 38. The hoppers 60 each include a forwardly inclined bottom wall 64 bent to form a trough section 66 at its forward, discharge end 68, and outwardly and upwardly flared side walls 70. The hoppers 60 are positioned and arranged such that mushrooms or the like poured thereon gravitate toward the trough areas 66 and are discharged from the ends 68.

Figures 7, 8, 10:
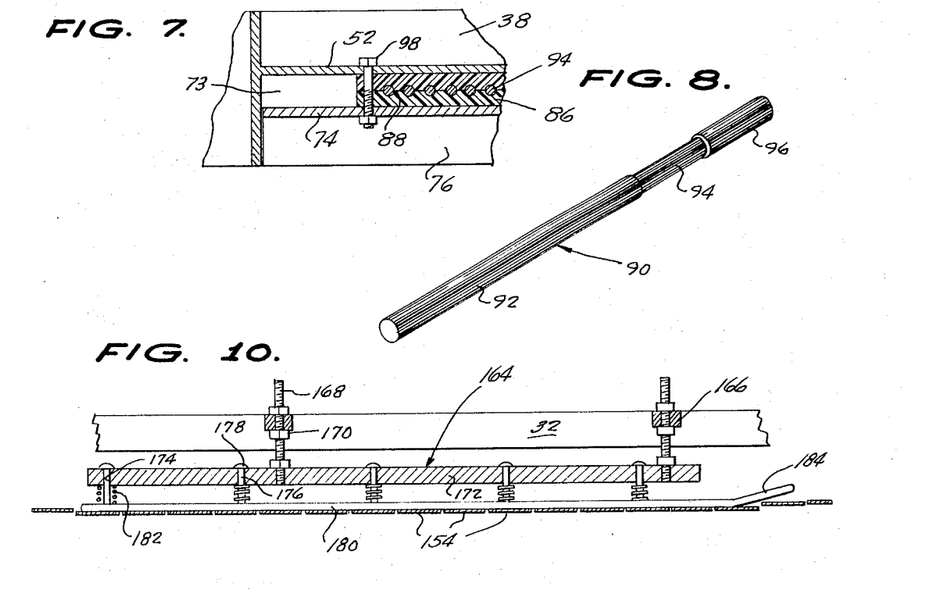
FIGURE 7 is an enlarged, fragmentary sectional view disclosing details, the view being taken substantially on the line 7—7 of FIGURE 5, looking in the direction of the arrows.
FIGURE 8 is an enlarged perspective view showing a pin means employed in the feed mechanism hereof.
FIGURE 10 is an enlarged sectional view, taken along the line 10—10 of FIGURE 9, looking in the direction of the arrows.

Movable positioning and conveying means 72 is supplied adjacent each hopper 60 and is arranged to receive the materials released from the discharge ends 68 thereof. As best shown in FIGURES 5 and 7, each bracket 38 has a central cutout portion or slot 73 therein in which is mounted a clamping bar 74 which is inclined from side to side and has an inner leg member 76. Bolt means 78 extend through the leg member 76, a spacing plate 80 and a second leg member 82 having a horizontal outer ledge 84. Clamped between each element 52 and bar 74 are a pair of elongated bearing members 86 with a plurality of semi-circular, transversely extending, vertically aligned openings 88 formed therein to define cylindrical bearing means. As shown in FIGURE 5, the bearings are inclined inwardly, and the members 86 are preferably formed of a suitable plastic material, thus reducing or eliminating the need for lubrication.

Figure 6:
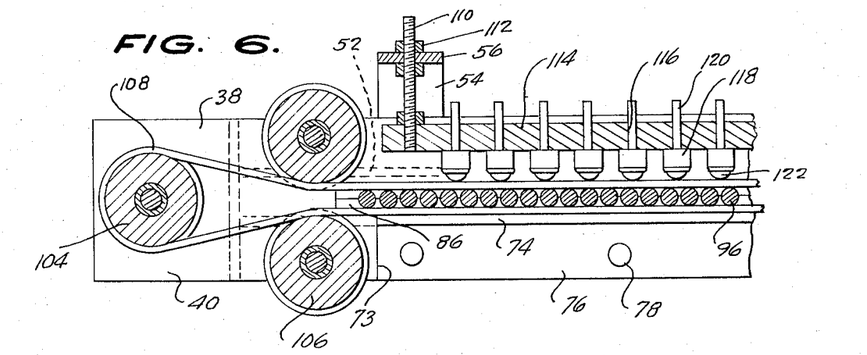
FIGURE 6 is a detail, longitudinal sectional view taken on the line 6—6 of FIGURE 4, looking in the direction of the arrows.

The positioning means 72 further comprises a plurality of pins 90, one of which is per se illustrated in FIGURE 8. The pins 90 are each of substantially cylindrical, elongated form and include elongated inner end portions 92, reduced diameter central portions 94, and outer end portions 96. The pins 90 are rotatably mounted between the pairs of bearing members 86, the reduced diameter central portions 94 thereof being engaged in the openings 88. As seen in FIGURE 7, the bearing members are clamped about the pins and retained in place by bolts 98 extended through the elements 52, the bars 74, and the coaligned openings in the ends of the members 86. An elongated axle 100 extends through the brackets 38 and has a belt driving wheel 102 mounted for rotation therewith adjacent the outer side of each bracket. The forward end 40 of each bracket rotatably carries a generally aligned idler wheel 104, the wheels 104, as seen in FIGURE 4, being tilted vertically with respect to the wheels 102. A plurality of rotatable positioning wheels 106 are mounted on the bracket 38 in at least general alignment with the wheels 102 and 104, and an endless driving belt 108 is trained about the pairs of wheels 102–104 and between the positioning wheels 106. As seen in FIGURES 4 and 6, each of the apertured arms 56 of the members 54 has a depending, screw threaded rod 110 therein with lock nuts 112 for variance in the depth thereof and threadedly engaged with an elongated support block 114. The block 114 has a series of vertical openings 116 formed therein. A plurality of bearings 118 are provided and have shafts 120 mounted in the vertical openings 116. Spherical rollers 122 of the bearings 118 contact the belt 108 pressing one side of the same against the pin outer portions 96, the bar 74 pressing the other side of the belt thereagainst. Thus, as the belts 108 are moved by the rotation of the wheels 102, the pins are frictionally rotated.

Figure 2:
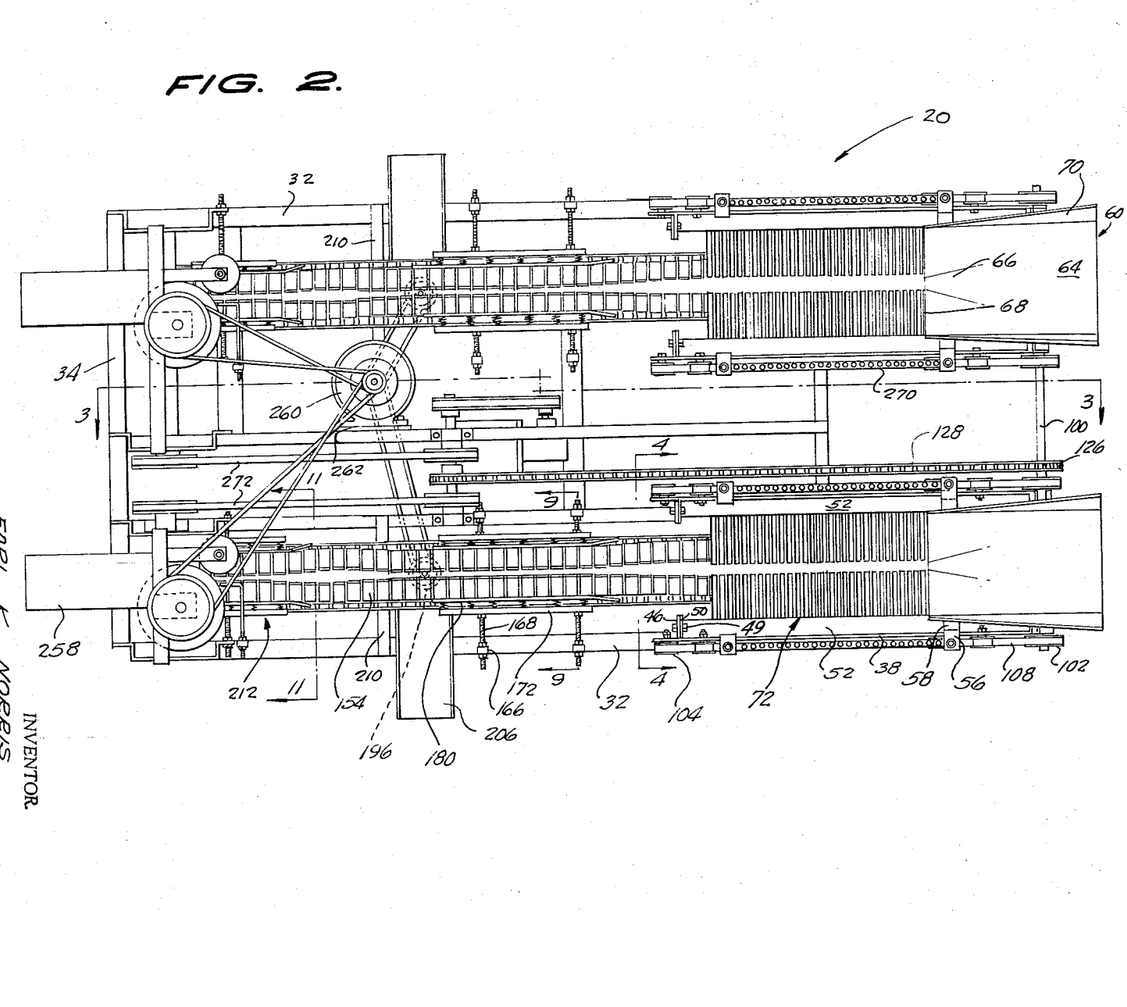
FIGURE 2 is a top plan view of the machinery hereof.

In FIGURES 1, 2 and 4, it is seen that the adjacent rows of pins are spaced apart a selected distance. This distance is such that, when mushrooms M move from the hoppers 60 onto the positioning means 72, the stems S thereof are agitated and gravitated into the space 124 between the rows, with the crowns C riding on the inner portions 92 of the pins 90.

Rotary movement of the axle 100 is supplied through a drive sprocket 126 mounted thereon operatively associated with a chain 128, described in more detail below.

Secured on the upper braces 32 adacent the legs 26 are support bars 130 with inturned sides 132 bearing against the legs, and each has an axle mount 134 thereon provided with a longitudinal adjustment screw 136. A first transverse axle 138 is mounted in the mounts 134 and carries sprockets 140 arranged in adjacent pairs. At the opposite end of the framework, extending between adjacent legs 24, are horizontal supports 142 for bearing assemblies 144. An axle 146 extends therethrough, and has drive sprockets 148 fixed thereon, in pairs, in longitudinal alignment with the pairs of sprockets 140. A link chain 150 is trained around the sprockets and carries on its links flexible, metallic members 152 with inturned fingers 154 and rebent inner ends 156 similar to the chain and finger construction shown in my prior copending application referred to above. The chain and members are trained about the sprockets to form upper and lower flights.

Referring to FIGURES 2 and 4, it is seen therein that the horizontal portions 44 of each of the brackets 42 have a pair of rods 158 secured thereto by nuts 160, the rods serving to support an arcuate spreader means 162 of L-shaped cross section. The spreader 162 is arranged to contact the members 152 and to spread the same apart as they move beneath the pins 90 at the discharge ends of the means 72, the spread causing the ends 156 of the fingers 152 to be spaced apart a distance approximately equal to the space between the pins 90 so that mushrooms M discharged from the pins gravitate between the fingers with the crowns C resting on the ends 156 and the stems S depending therebetween. As the chains pass the spreader means, the inherent resiliency of the members 152 cause the fingers to grip the stems.

Located on opposite sides of the upper frames 32 at locations spaced forwardly of the means 72 are compression bar means 164, best seen in FIGURE 10. The compression bar means comprise a pair of elongated, vertical supports 166 secured on the frame 32 and having apertured upper ends. Threaded horizontal rods 168 extend through the support apertures and are adjustably located by lock nuts 170. The rods 168 are threadedly engaged with an elongated bar 172 with plural openings 174 therein, arranged adjacent the paths of travel of the members 154. Mounted in each opening 174 is a rivet 176 with a head 178 at its outer end and fixed at the inner ends thereof to a compression bar 180. Coil springs 182 are positioned about the rivets 176 to urge the bar 180 away from the bar 172 and against the members 154 of the upper flight. As seen in FIGURE 10, the compression bar 180 has a forward, outwardly bent portion 184 facilitating compression of the members 152 between the bars 180.

Mounted on the axle 138 between the adjacent sprockets 140 and rotatable therewith is a wheel 186, and a second wheel 188 is mounted on an axle 190 which is carried in a bearing 192 (FIGURE 3) secured adjacent one row of supports 166, the second wheel being elevated with respect to the first wheel 186. A belt 194 is trained about the wheels and contacts the roots R of the mushrooms as they are moved thereacross (FIGURE 4) whereby the roots are positioned in substantially a common horizontal plane within the fingers, prior to the further compression of the fingers by the bars 180.

Figure 9:
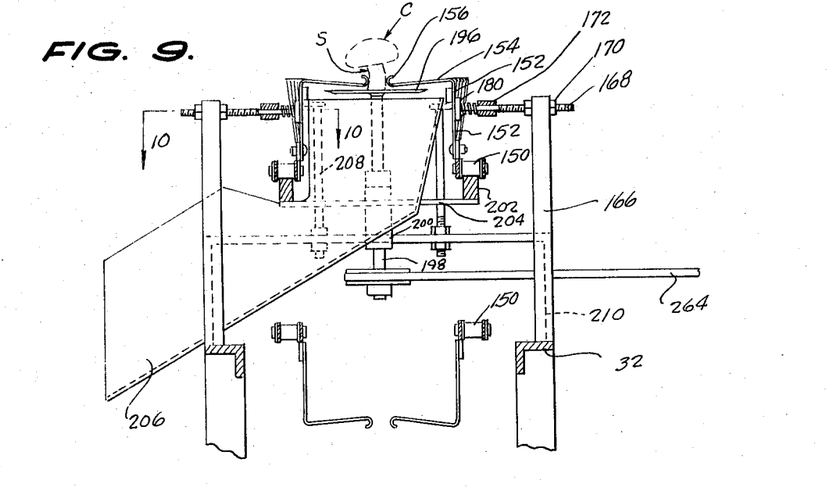
FIGURE 9 is an enlarged vertical cross sectional view, taken substantially at 9—9 of FIGURE 2, looking in the direction of the arrows.
Figure 11:
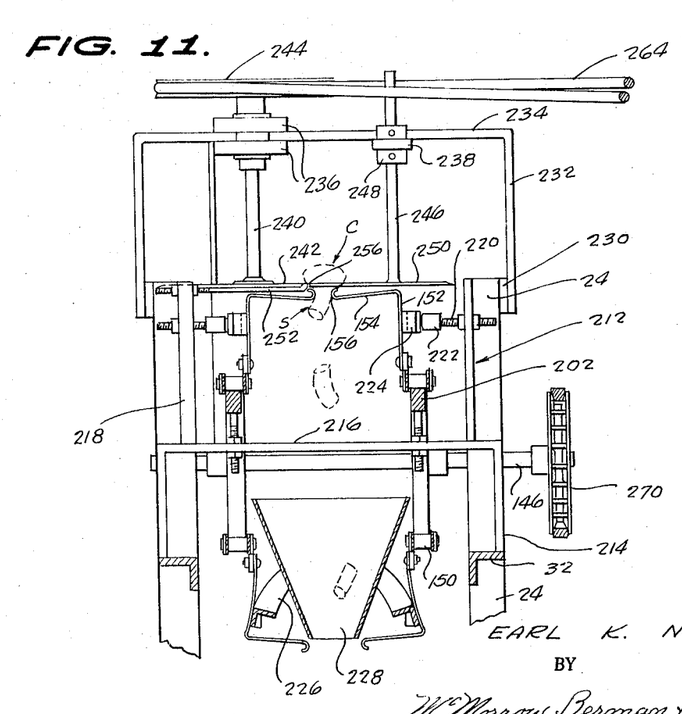
FIGURE 11 is an enlarged, sectional view of the crown severance means hereof, taken substantially on the line 11—11 of FIGURE 2, looking in the direction of the arrows.

A circular root severing blade 196 is mounted on a rotatable shaft 198 between the chains 150 which extends through a bearing 200, the blade 196 being transversely aligned with the compression means 164 whereby the mushrooms are tightly gripped during the severance of the roots R. As best seen in FIGURES 4, 9, and 11, chain guide bars 202 are extended beneath the chain upper flights and carry a cross piece 204 for support of the bearing 200. Also secured to the cross piece 204 is a discharge hopper 206 with walls suitably arranged to convey the severed roots R away from the machinery.

As the mushrooms M pass the root severing blade 196, the members 152 contact a second spreader means comprising bars 208 (FIGURE 9) fixed to a bracket 210 which extends between the upper braces 32 between the flights.

Thus, the mushroom stems S again gravitate downwardly permitting the crowns C to rest on the ends 156 of the fingers in longitudinal alignment with one another.

After seating of the crowns on the ends 156, the upper flights of members 152 contact second compression means 212 similar to the means 164. A U-shaped bridge member 214 having a horizontal portion 216 extends between adjacent upper frame members 32 and rear uprights 218 are secured thereto. Threaded pins 220 extend from the rear uprights 218 and from the legs 24 and carry a bar 222 which has apertures therein and spring encased pins or rivets biasing a compression bar 224 against the member 154, thereby compressing same in the manner previously described with respect to the first compression means. As best shown in FIGURE 11, there is provided a lower flight spreader means positioned beneath the second compression means and comprising a bar 226 of L-shaped section. A generally conical stem hopper 228 is mounted between the bar sections and serve to direct severed stems S to suitable receptacle or discharge means (not shown).

Extending longitudinally between the upper ends of the forward legs 24 are structural braces 230, and inverted, U-shaped brackets 232 with bight portions 234 extend between adjacent pairs thereof over each of the rows of fingers. A first pair of substantially rectangular supports 236 is extended outwardly from the bight portions, and a second, generally rectangular elongated single support 238 also extends therefrom. The first supports 236 carry a shaft 240 having a main crown blade 242 fixed to the lower ends thereof, and have a pulley wheel 244 at their upper ends. The second supports 138 have idler shafts 246 mounted in suitable bearings 248 thereon and carry circular blades 250 on the lower ends thereof of reduced diameter with respect to the blades 242, said blades being coplanar with the main blades 242. As seen in FIGURES 1 and 11 a rod 252 is secured in one of the uprights 218 by lock nuts 254 and has a bent end 256 which serves to position the crowns C immediately prior to blade contact. As the mushrooms are carried between the rotating main blade 242 and the positioning blade 250, the crowns C are uniformly severed from the stems S. Stems S drop into the hopper 228. The crowns C are propelled outwardly from the blade means and into a hopper shroud 258 which directs the same to a suitable receptacle or conveying means (not shown).

Each of the blades 196 and 242 is powered by a single motor 260 mounted on a plate 262 secured to one of the braces 32, the motor being connected with the pulley means of each blade through suitable drive belts 264. The shaft 100 for the positioning means and the main drive axle 142 are each driven from a motor 266 mounted on a base 268 secured to the lower braces 28, the movement being supplied through conventional drive chain means 270 supplying motion to the chain 128 and through belt means 272 to the shafts 146 driving the chain means.

Having described and illustrated an embodiment of this invention in some detail, it will be understood that this description and illustration are offered merely by way of example, and that the invention is to be limited in scope only by the appended claims.

What is claimed is:

1. Plural food processing machinery for cutting mushrooms or like foods which have a stem, a root, and a crown, the machinery comprising:
   a plurality of side-by-side input hopper means each including an inclined bottom wall forming a trough and having a discharge edge;
   movable positioning means arranged at each of the discharge edges, the positioning means each including a pair of spaced apart supports, a plurality of elongated, rotatable pins with inner end portions, reduced diameter center portions, and outer end portions, secured in spaced rows in each support with the center portions engaged in the supports, said rows being inclined with respect to one another;
   belt means bearing against the outer end portions of the pins to rotate same and to thereby convey the mushrooms and agitate the same into a position with the stem depending into the space between the rows with the crowns riding on the pin inner end portions;
   the rows of pins having discharge ends;
   a pair of laterally spaced, movable flexible members, carrying transversely aligned inturned fingers, arranged in longitudinal alignment with the rows of pins and being movable beneath the discharge ends thereof;
   means for spreading the fingers as they are moved beneath the discharge ends, to a distance apart at least equal to said space between said rows of pins whereby the mushrooms are dropped from the rows between said fingers with the crowns resting thereon;
   elevator means, comprising an inclined belt adapted to move the mushrooms vertically in the fingers to positions in which the roots thereof are longitudinally aligned;
   compression bar means arranged to contact the fingers on opposite sides adjacent the elevator means;
   a root severing blade, adapted to sever the roots as the fingers are moved thereover, adjacent the compression bar means;
   spreader means biasing the fingers apart to substantially said distance following the severeance of the roots whereby the crowns are supported on the fingers in substantially longitudinal alignment;
   crown severing blades, including a positioning blade and a main cutting blade mounted above the fingers and adapted to sever the crowns from the stems;
   second compression bar means arranged adjacent the crown severing blades; and
   hopper means for directing the stems and crowns, respectively, away from the machinery after severance.

2. Plural food processing machinery for cutting mushrooms or like foods which have a stem, a root, and a crown, the machinery comprising:
   a plurality of side-by-side input hopper means each including an inclined bottom wall forming a trough and having a discharge edge;
   movable positioning means arranged at each of the discharge edges, the positioning means each including a pair of spaced apart supports, a plurality of elongated, rotatable pins with inner end portions, reduced diameter center portions, and outer end portions, secured in spaced rows in each support with the center portions engaged in the supports, said rows being inclined with respect to one another;
   belt means bearing against the outer end portions of the pins to rotate same and to thereby convey the mushrooms and agitate the same into a position with the stem depending into the space between the rows with the crowns riding on the pin inner end portions;
   the rows of pins having discharge ends;
   a pair of laterally spaced, movable flexible members, carrying transversely aligned inturned fingers, arranged in longitudinal alignment with the rows of pins and being movable beneath the discharge ends thereof;
   means for spreading the fingers as they are moved beneath the discharge ends, to a distance apart at least equal to said space between said rows of pins whereby the mushrooms are dropped from the rows between said fingers with the crowns resting thereon;
   elevator means, comprising an inclined belt adapted to move the mushrooms vertically in the fingers to positions in which the roots thereof are longitudinally aligned;
   a root severing blade, adjacent the forward end of said inclined belt and adapted to sever the roots as the fingers are moved thereover;
   spreader means biasing the fingers apart to substantially said distance following the severance of the roots whereby the crowns are supported on the fingers in substantially longitudinal alignment;
   crown severing blades, including a positioning blade and a main cutting blade mounted above the fingers and adapted to sever the crowns from the stems; and
   hopper means for directing the stems and crowns, respectively, away from the machinery after severance.

3. Plural food processing machinery for cutting mushrooms or like foods which have a stem, a root, and a crown, the machinery comprising:
   a plurality of side-by-side input hopper means each including an inclined bottom wall forming a trough and having a discharge edge;
   movable positioning means arranged at each of the discharge edges, the positioning means each including a pair of spaced apart supports, a plurality of elongated, rotatable pins with inner end portions, reduced diameter center portions, and outer end portions, secured in spaced rows in each support with the center portions engaged in the supports, said rows being inclined with respect to one another;
   belt means bearing against the outer end portions of the pins to rotate same and to thereby convey the mushrooms and agitate the same into a position with the stem depending into the space between the rows with the crowns riding on the pin inner end portions;
   the rows of pins having discharge ends;
   a pair of laterally spaced, movable flexible members, carrying transversely aligned inturned fingers, arranged in longitudinal alignment with the rows of pins and being movable beneath the discharge ends thereof;

elevator means, comprising an inclined belt adapated to move the mushrooms vertically in the fingers to positions in which the roots thereof are longitudinally aligned;

compression bar means arranged to contact the fingers on opposite sides adjacent the elevator means;

a root severing blade, adapted to sever the roots as the fingers are moved thereover, adjacent the compression bar means;

crown severing blades, including a positioning blade and a main cutting blade mounted above the fingers and adapted to sever the crowns from the stems;

second compression bar means arranged adjacent the crown severing blades; and hopper means for directing the stems and crowns, respectively, away from the machinery after severance.

4. Plural food processing machinery for cutting foods which have a stem, a root, and a crown, the machinery comprising:

a plurality of side-by-side input hopper means having discharge edges;

movable positioning means arranged at each of the discharge edges, the positioning means including pairs of spaced apart supports, and rotatable pins mounted in said supports and inclined toward one another;

belt means for rotating the pins;

the rows of pins having discharge ends;

a pair of laterally spaced, movable flexible members, carrying transversely aligned inturned fingers, arranged in longitudinal alignment with the rows of pins and being movable beneath the discharge ends thereof;

means for spreading the fingers as they are moved beneath the discharge ends, whereby the foods are dropped from the rows between said fingers with the crowns resting thereon;

a root severing blade, adapted to sever the roots as the fingers are moved thereover;

crown severing blades, including a positioning blade and a main cutting blade mounted above the fingers and adapted to sever the crowns from the stems; and hopper means for directing the cut materials away from the machinery.

5. Food machinery comprising:

input hopper means having a discharge edge;

movable positioning means arranged at the discharge edge, the positioning means including a pair of spaced apart supports, a plurality of elongated rotatable pins with inner end portions, reduced diameter center portions, and outer end portions, secured in spaced rows in each support with the center portions engaged in the supports, the rows being inclined with respect to one another;

belt means bearing against the outer end portions of the pins to rotate same and to thereby convey the foods and agitate the same;

the rows of pins having discharge ends;

a pair of laterally spaced, movable flexible members, carrying transversely aligned inturned fingers, arranged in longitudinal alignment with the rows of pins and being movable beneath the discharge ends thereof;

means for spreading the fingers as they are moved beneath the discharge ends;

elevator means, comprising an inclined belt adapted to move beneath the fingers to position the foods therein;

compression bar means arranged to contact the fingers on opposite sides adjacent the elevator means;

blade means beneath the fingers adjacent the compression bar means;

second spreader means forward of said blade means for biasing the fingers apart;

second blade means positioned over the fingers forward of said second spreader means;

second compression bar means adjacent said second blade means; and hopper means for directing cut foods away from the machinery.

6. Food machinery comprising:

input hopper means having a discharge edge;

movable positioning means arranged at the discharge edge, the positioning means including a pair of spaced apart supports, a plurality of elongated rotatable pins with inner end portions, reduced diameter center portions, and outer end portions, secured in spaced rows in each support with the center portions engaged in the supports, the rows being inclined with respect to one another;

belt means bearing against the outer end portions of the pins to rotate same and to thereby convey the foods and agitate the same;

the rows of pins having discharge ends;

a pair of laterally spaced, movable flexible members, carrying transversely aligned inturned fingers, arranged in longitudinal alignment with the rows of pins and being movable beneath the discharge ends thereof;

means for spreading the fingers as they are moved beneath the discharge ends;

elevator means, comprising an inclined belt adapted to move beneath the fingers to position the foods therein;

compression bar means arranged to contact the fingers on opposite sides adjacent the elevator means;

blade means beneath the fingers adjacent the compression bar means;

second spreader means forward of said blade means for biasing the fingers apart;

second blade means positioned over the fingers forward of second spreader means; and second compression bar means adjacent said second blade means.

7. Food machinery comprising:

input hopper means having a discharge edge;

movable positioning means arranged at the discharge edge, the positioning means including a pair of spaced apart supports, a plurality of elongated rotatable pins with inner end portions, reduced diameter center portions, and outer end portions, secured in spaced rows in each support with the center portions engaged in the supports, the rows being inclined with respect to one another;

belt means bearing against the outer end portions of the pins to rotate same and to thereby convey the foods and agitate the same;

the rows of pins having discharge ends;

a pair of laterally spaced movable flexible members, carrying transversely aligned inturned fingers, arranged in longitudinal alignment with the rows of pins and being movable beneath the discharge ends thereof;

means for spreading the fingers as they are moved beneath the discharge ends;

compression bar means arranged to contact the fingers on opposite sides forward of said discharge ends;

blade means beneath the fingers adjacent the compression bar means;

second spreader means forward of said blade means for biasing the fingers apart;

second blade means positioned over the fingers and forward of said second spreader means;

second compression bar means adjacent said second blade means; and hopper means for directing cut foods away from the machinery.

8. Food machinery comprising:

input hopper means having a discharge edge;

movable positioning means arranged at the discharge edge, the positioning means including a pair of spaced apart supports, a plurality of elongated rotatable pins with inner end portions, reduced diameter center portions, and outer end portions, secured in spaced rows in each support with the center portions engaged in the supports, the rows being inclined with respect to one another;

belt means bearing against the outer end portions of the pins to rotate same and to thereby convey the goods and agitate the same;

the rows of pins having discharge ends;

a pair of laterally spaced, movable flexible members, carrying transversely aligned inturned fingers, arranged in longitudinal alignment with the rows of pins and being movable beneath the discharge ends thereof;

elevator means, comprising an inclined belt adapted to move beneath the fingers to position the foods therein;

blade means beneath the fingers adjacent the forward end of said inclined belt;

second blade means positioned over the fingers forward of said first blade means; and hopper means for directing cut foods away from the machinery.

9. Food machinery comprising:

input hopper means having a discharge end;

movable positioning means arranged at the discharge end, the movable positioning means including a pair of spaced apart supports and a plurality of rotatable members secured in spaced apart relation in each support, the members being inclined with respect to one another;

means engaging the positioning means to rotate the same and to thereby convey the foods from the hopper means;

a pair of laterally spaced movable flexible members, carrying transversely aligned inturned fingers, arranged in longitudinal alignment with the rotatable members and being beneath the members and being movable beneath the discharge ends thereof;

means for spreading the fingers as they are moved beneath the discharge ends;

compression bar means arranged to contact the fingers on opposite sides;

blade means beneath the fingers adjacent said compression bar means;

second spreader means forward of said blade means for biasing the fingers apart;

second blade means positioned over the fingers and forward of said second spreader means;

second compression bar means adjacent the second blade means; and hopper means for directing cut foods away from the machinery.

10. Food machinery for processing foods which have a root, a stem and a crown, comprising input hopper means having a discharge end, movable positioning means arranged at the discharge end and including a plurality of rotatable members secured in spaced apart relation inclined with respect to one another to form an elongated trough open at the bottom, means engaging the positioning means to rotate the same and to thereby convey the food from the hopper means longitudinally of said trough, a pair of laterally spaced movable flexible members carrying transversely aligned inturned fingers and arranged in longitudinal alignment with the rotatable members and being beneath the members and being movable beneath the discharge ends thereof to receive the food crowns, means for spreading the fingers as they are moved beneath the discharge ends, compression bar means arranged forward of said spreading means to contact the fingers on opposite sides, blade means beneath the fingers adjacent said compression bar means, second spreader means forward of said blade means for biasing the fingers apart, second blade means positioned over the fingers and forward of said second spreader means, second compression bar means adjacent the second blade means, and hopper means for directing cut foods away from the machinery.

References Cited by the Examiner

UNITED STATES PATENTS

| 1,914,621 | 6/1933 | Siemann | 146—85 X |
| 2,205,397 | 6/1940 | Drake | 146—27 |
| 3,164,182 | 1/1965 | Hughes et al. | 146—81 |
| 3,179,138 | 4/1965 | Norris | 146—81 |

WILLIAM W. DYER, Jr., *Primary Examiner.*

W. GRAYDON ABERCROMBIE, *Examiner.*